United States Patent
Nordlin

(10) Patent No.: US 6,766,581 B2
(45) Date of Patent: Jul. 27, 2004

(54) CABLE CUTTER/CRIMPER MECHANISM

(75) Inventor: William F. Nordlin, Poplar Grove, IL (US)

(73) Assignee: Greenlee Textron Inc., Rockford, IL (US)

(*) Notice: Subject to any disclaimer, the term of this patent is extended or adjusted under 35 U.S.C. 154(b) by 0 days.

(21) Appl. No.: 10/079,089

(22) Filed: Feb. 20, 2002

(65) Prior Publication Data

US 2002/0170182 A1 Nov. 21, 2002

Related U.S. Application Data

(60) Provisional application No. 60/291,513, filed on May 16, 2001.

(51) Int. Cl.⁷ ............................................. B26B 13/00
(52) U.S. Cl. .............................. 30/252; 30/251; 74/143
(58) Field of Search ......................... 30/250, 188, 252, 30/254, 251; 83/603; 74/143; 269/225; 81/364, 366

(56) References Cited

U.S. PATENT DOCUMENTS

| | | | |
|---|---|---|---|
| 857,663 A | * 6/1907 | Osborn | |
| 1,454,917 A | * 5/1923 | Barret | |
| 1,823,760 A | * 9/1931 | Pierce | 254/217 |
| 2,280,159 A | * 4/1942 | Neal | 30/231 |
| 2,353,922 A | * 7/1944 | Neal | 83/603 |
| 2,526,263 A | * 10/1950 | Neal | 83/603 |
| 2,641,136 A | * 6/1953 | Marsden, Jr. et al. | 74/143 |
| 2,861,491 A | 11/1958 | Rozmus | |
| 3,101,017 A | 8/1963 | Malkin et al. | |
| 3,210,844 A | 10/1965 | Tontscheff | |
| 3,885,309 A | * 5/1975 | Lund et al. | 30/250 |
| 3,922,783 A | * 12/1975 | Hayes | 30/250 |
| 4,055,891 A | 11/1977 | Wick | |
| 4,176,450 A | 12/1979 | Muromoto, deceased | |
| 4,178,682 A | 12/1979 | Sadauskas | |
| 4,186,484 A | 2/1980 | Tanaka | |
| 4,223,439 A | 9/1980 | Rommel | |
| 4,312,127 A | * 1/1982 | Tanaka | 30/92 |
| 4,364,292 A | 12/1982 | Wozniak et al. | |
| 4,378,636 A | 4/1983 | Wick | |
| 4,409,865 A | * 10/1983 | Krautter et al. | 81/57.39 |
| 4,433,569 A | * 2/1984 | Santinelli | 72/409.01 |
| 4,599,795 A | 7/1986 | Yokoyama | |
| 4,644,650 A | * 2/1987 | Laux et al. | 30/250 |
| 4,677,748 A | 7/1987 | Kobayashi | |
| 4,779,342 A | 10/1988 | Kobayashi et al. | |
| 4,809,571 A | 3/1989 | Hatfield | |
| 4,899,445 A | 2/1990 | Erbrick et al. | |
| 5,009,132 A | * 4/1991 | Gilberto | 81/57.3 |
| 5,184,404 A | 2/1993 | Chen | |
| 5,218,768 A | 6/1993 | Putsch et al. | |
| 5,231,763 A | 8/1993 | Laux | |
| 5,307,565 A | 5/1994 | Erbrick et al. | |
| 5,331,742 A | * 7/1994 | Schmode et al. | 30/245 |
| 5,526,570 A | 6/1996 | Beetz et al. | |
| 5,718,051 A | * 2/1998 | Huang | 30/250 |
| 6,098,291 A | * 8/2000 | Wang | 30/92 |
| 6,178,643 B1 | 1/2001 | Erbrick et al. | |
| 6,216,347 B1 | 4/2001 | Wada | |

OTHER PUBLICATIONS

Six pages from Greenlee Full Line Catalog 1997, month unknown.

* cited by examiner

Primary Examiner—Kenneth E. Peterson
(74) Attorney, Agent, or Firm—Trexler, Bushnell, Giangiorgi, Blackstone & Marr, Ltd.

(57) ABSTRACT

A tool for cutting/crimping a workpiece, such as a cable, includes an automatic rapid blade advance such that a blade on a movable jaw of the tool advances toward cutting the cable every time the handles of the tool are closed. The automatic rapid blade advance also advances the blade on the movable jaw toward cutting the cable every time the handles of the tool are opened up until the blade on the movable jaw first encounters a resistive force from the cable. The tool also includes an automatic blade return such that the blade on the movable jaw will automatically return to its original position after the blade has cut through or crimped the cable.

15 Claims, 12 Drawing Sheets

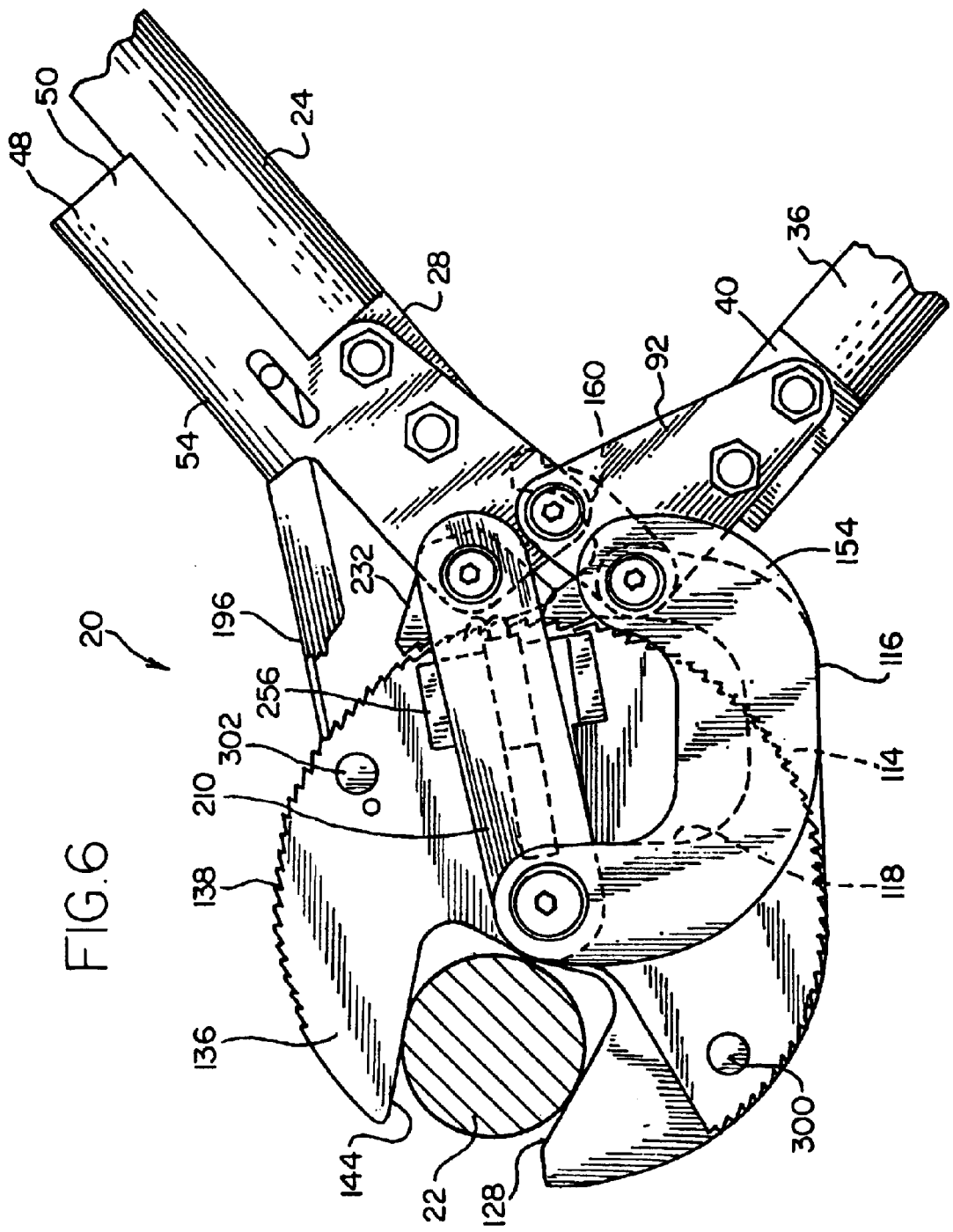

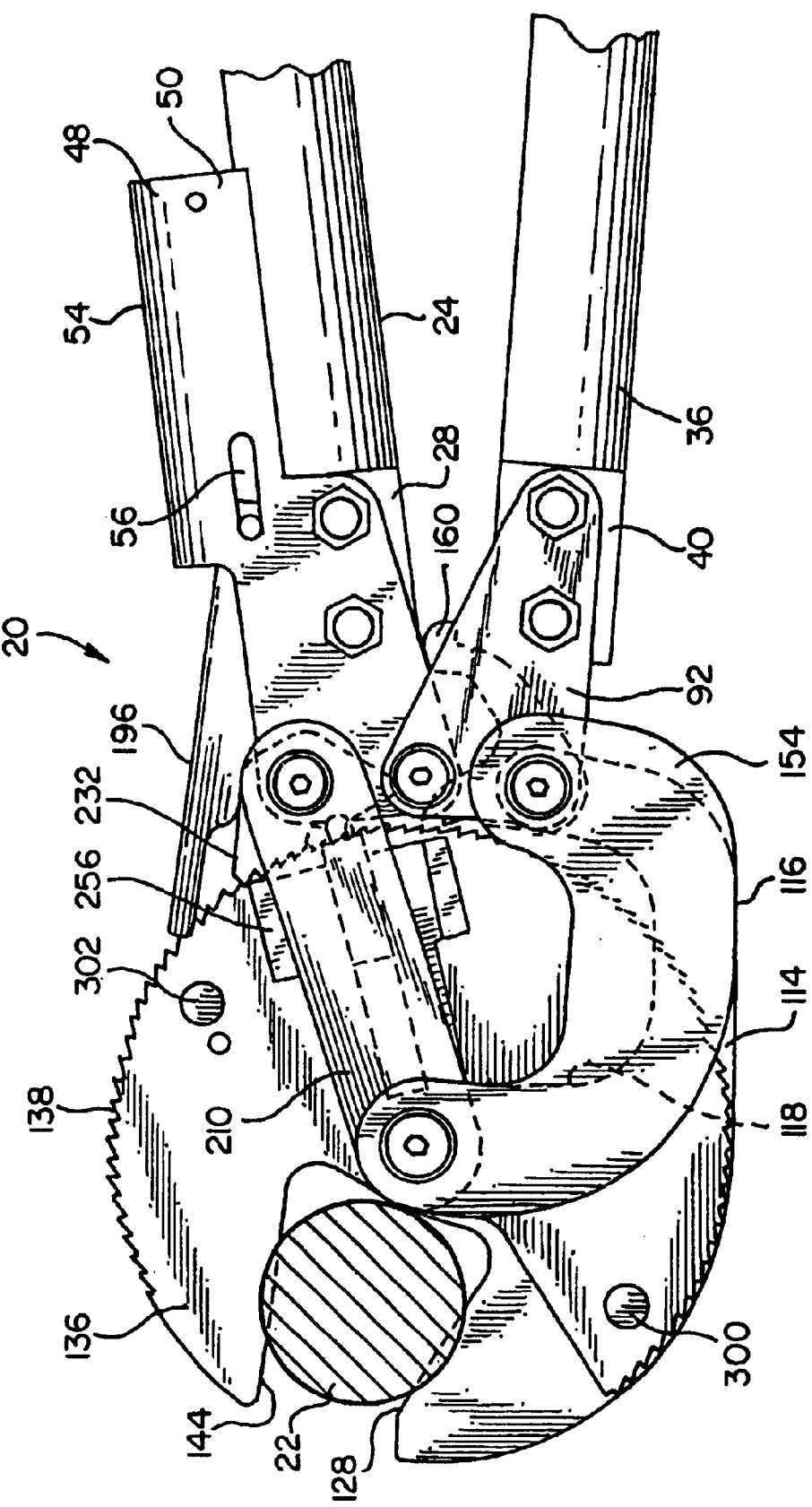

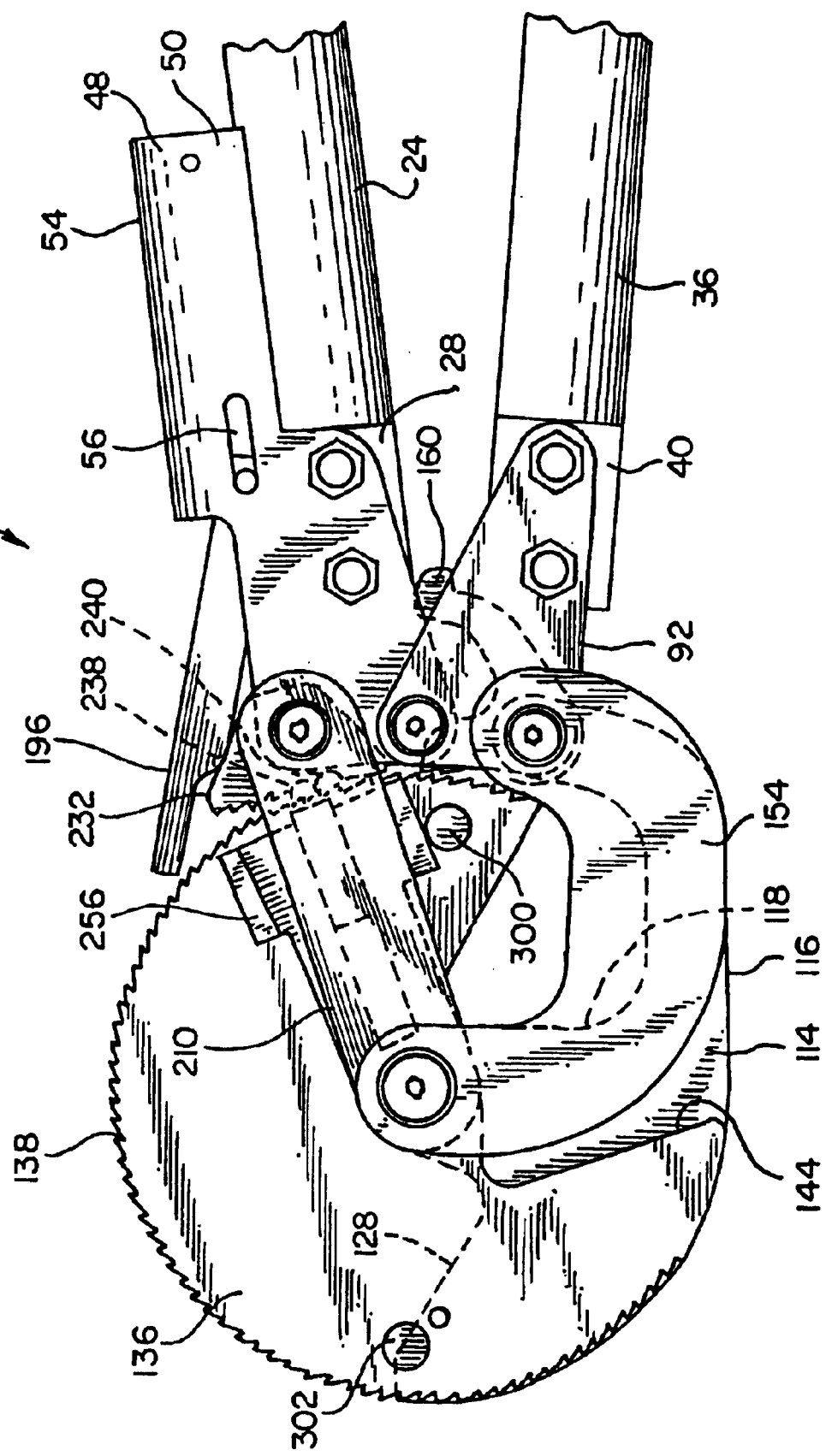

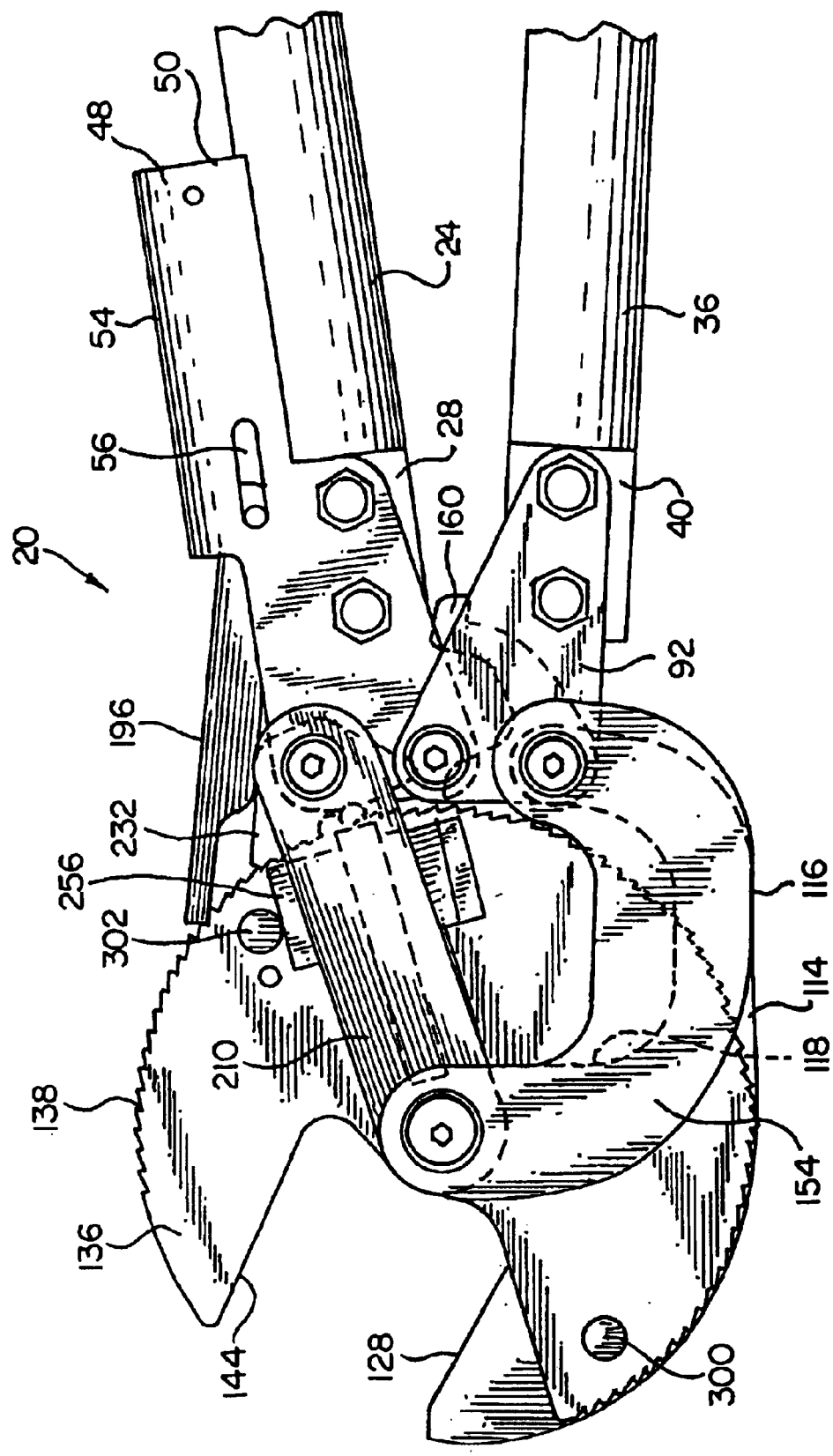

US 6,766,581 B2

CABLE CUTTER/CRIMPER MECHANISM

CROSS-REFERENCE

This patent application claims the benefit of domestic priority of U.S. Provisional application Ser. No. 60/291,513, filed May 16, 2001, and entitled "Improved Cable Cutter/Crimper Mechanism".

BACKGROUND OF THE INVENTION

A novel tool for cutting/crimping a workpiece, such as a cable, is provided.

There are many different types of tools that cut/crimp cables in many different ways. These tools generally cut through cables in one of two ways. The first way is by scissor cutting in which the blades of the cutter cut through the cable during a single closing motion of the handles of the cutter. The second way is by a ratchet mode. The ratchet mode provides a slower cut in which the blades of the tool slowly cut through the cable with each opening and closing motion of the handles of the cutter. The scissors cut generally provides a cut much quicker. The ratchet mode cut is preferred for a larger, thicker cable over the scissors cut because it provides a mechanical advantage to reduce operator effort.

Thus, there is a need for a tool that is capable of cleanly cutting through thick cable in a ratchet mode cut, but that also provides a faster cutting action than do ratchet mode cutters in the prior art.

OBJECTS AND SUMMARY OF THE INVENTION

A primary object of the invention is to provide a cable cutter/crimper having an automatic rapid advance feature.

Another primary object of the invention is to provide a cable cutter/crimper having an automatic blade return feature whereby the blades automatically return to their original position at the end of the cutting/crimping cycle.

An object of the invention is to provide a cable cutter/crimper that is easier to use and of a lower cost than prior cable cutters/crimpers.

A further object of the invention is to provide a cable cutter/crimper which makes use of the opening stroke of the handle to rapidly close the blades.

Another object of the invention is to provide a cable cutter/crimper which only requires one hand of a user to open the blades, allowing the user's free hand to grab the cable and insert it between the blades.

Yet another object of the invention is to provide a cable cutter/crimper in which the release mechanism cannot be accidentally actuated in the middle of the cutting cycle.

Another object of the invention is to provide a cable cutter/crimper that can be manufactured with various blade configurations for cutting/crimping copper, aluminum and steel reinforced power cables.

Yet another object of the invention is to provide a cable cutter which has enough mechanical advantage to cut Cardinal ACSR cable, but which is also fast enough to cut 300 MCM copper cable.

Briefly, and in accordance with the foregoing, a novel tool for cutting/crimping a workpiece, such as a cable, is provided. The tool includes an automatic rapid blade advance such that the blade on a movable jaw of the tool advances toward cutting the cable every time the handles of the tool are closed. The automatic rapid blade advance also advances the blade on the movable jaw toward cutting the cable every time the handles of the tool are opened up until the blade on the movable jaw first encounters a resistive force from the cable. The tool also includes an automatic blade return such that the blade on the movable jaw automatically returns to its original position after the blade has cut through or crimped the cable.

BRIEF DESCRIPTION OF THE DRAWINGS

The features of the present invention which are believed to be novel are described in detail hereinbelow. The organization and manner of the structure and operation of the invention, together with further objects and advantages thereof, may best be understood by reference to the following description taken in connection with the accompanying drawings wherein like reference numerals identify like elements in which:

FIGS. 3–9 are side elevational views of the tool depicting a complete cutting/crimping cycle with the tool of a workpiece.

DETAILED DESCRIPTION OF THE ILLUSTRATED EMBODIMENT

Figure 1:
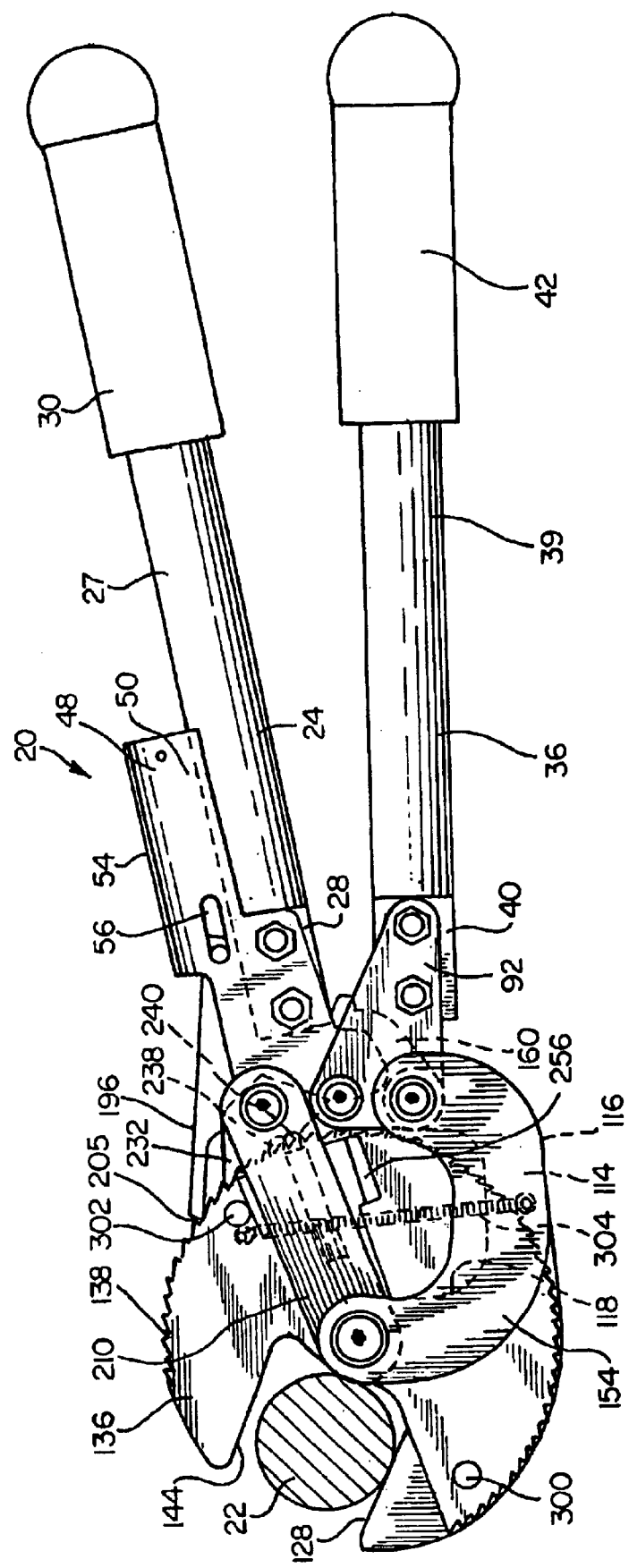
FIG. 1 is a side elevational view of a tool which incorporates the features of the present invention.

While this invention may be susceptible to embodiment in different forms, there is shown in the drawings and will be described herein in detail, a specific embodiment with the understanding that the present disclosure is to be considered an exemplification of the principles of the invention, and is not intended to limit the invention to that as illustrated.

A tool 20 which is used to cut and/or crimp a workpiece 22, such as cable, is provided. The tool 20 is preferably used to cut and/or crimp copper, aluminum and steel reinforced power cables. A side elevational view of the tool 20 which incorporates features of the present invention is shown in FIG. 1.

Figure 2:
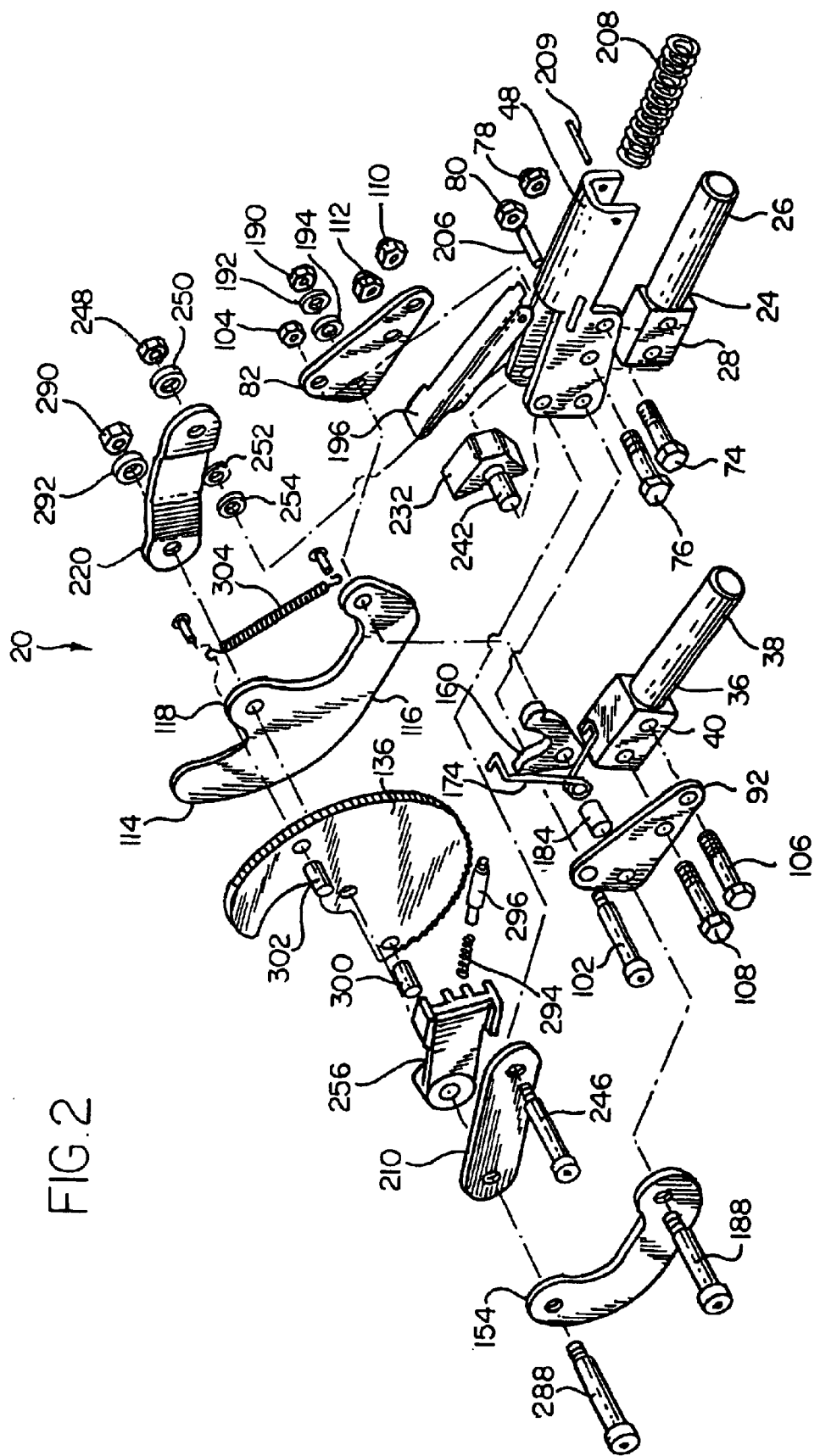
FIG. 2 is an exploded perspective view of the tool.
Figure 2A:
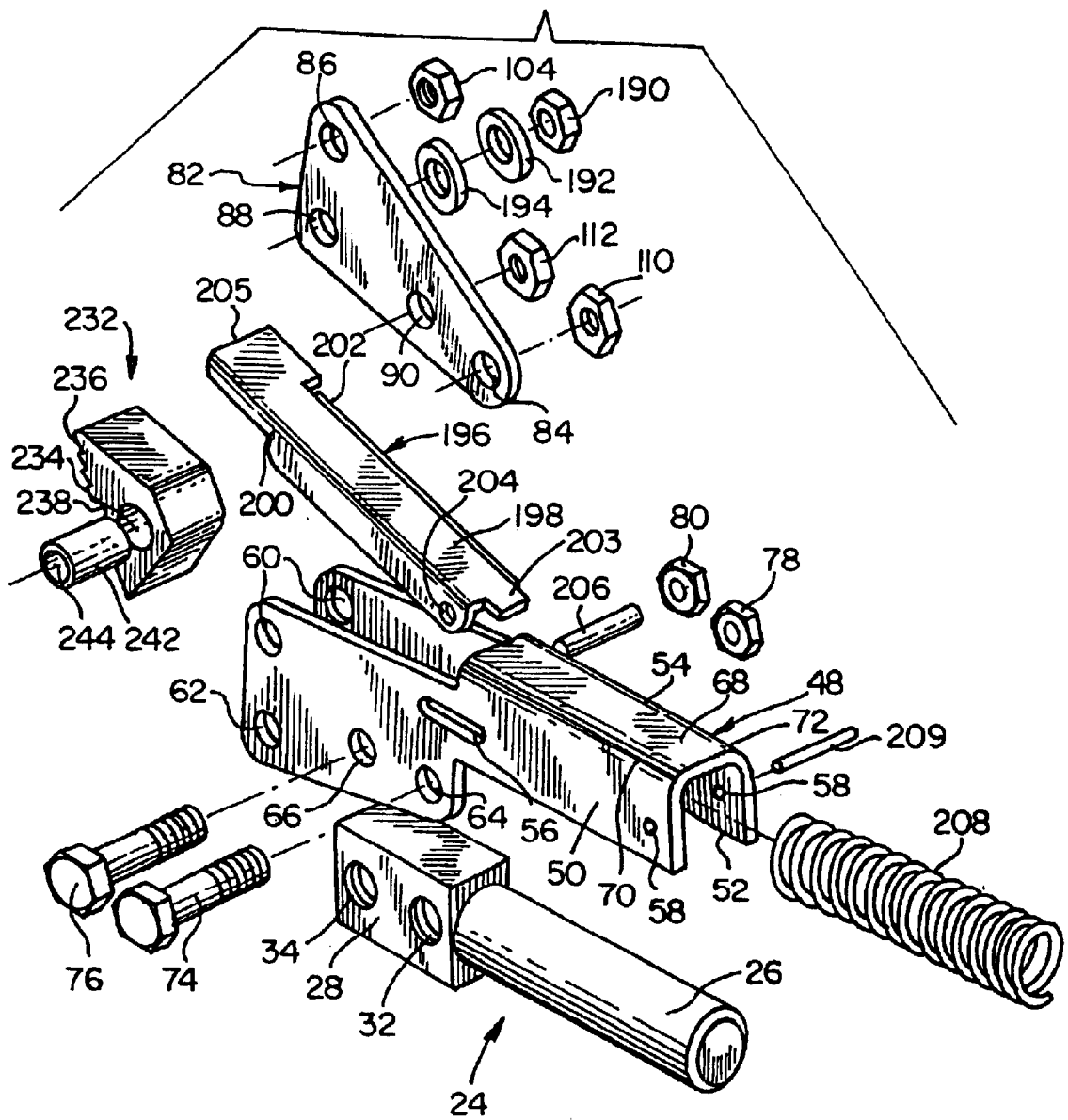
FIG. 2a is an exploded perspective view of a portion of the tool shown in FIG. 2.

As shown in FIGS. 2 and 2a, the tool 20 includes an elongated first lever 24 which has a first portion 26 and a second portion 28. The first portion 26 and the second portion 28 can be integrally formed or can be formed separately and connected by suitable means at one of their respective ends.

The first portion 26 is preferably a circular cylinder, although the first portion 26 could take on many different shapes, and is utilized as a handle portion. The first portion 26 can also be encompassed by a fiberglass portion 27 as illustrated in, for example, FIG. 1. The first portion 26 and/or fiberglass portion 27 can have a gripping material 30, as illustrated in FIG. 1, wrapped at least partially therearound such that a user's hand can easily grip the first portion 26 of the first lever 24. The length of the first portion 26 can also be varied if desired.

The second portion 28 is preferably an elongated member which is rectangular in cross-section, although the second portion 28 could take on many different shapes. The second portion 28 has a pair of apertures 32, 34 therethrough. The second portion 28 has a height that is larger than a height of the first portion 26, but the second portion 28 and the first portion 26 have a thickness that are substantially equivalent.

Figure 2B:
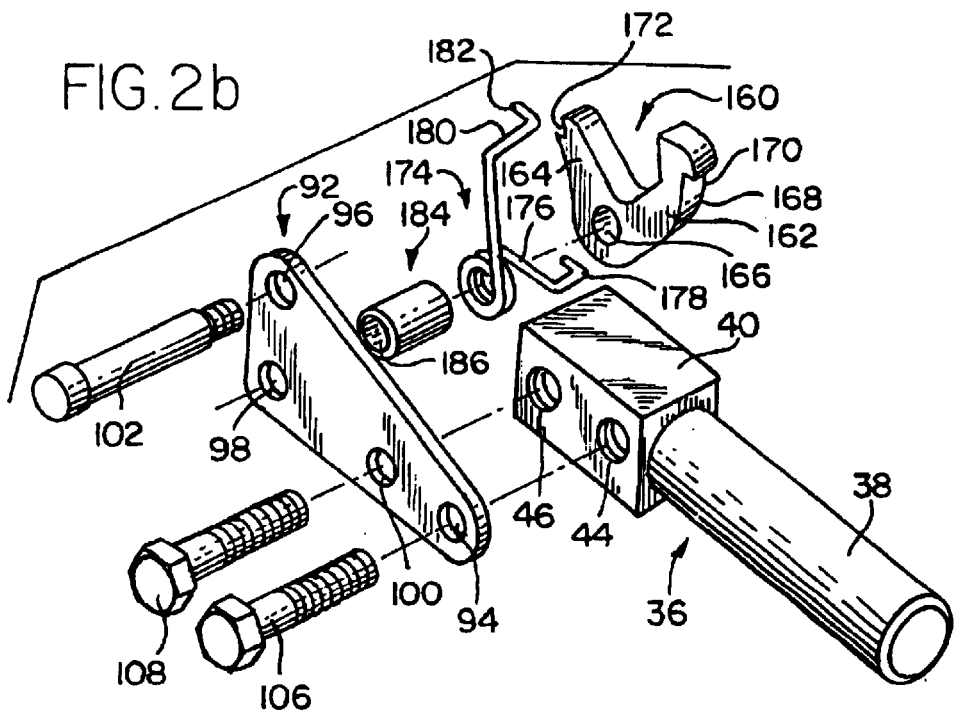
FIG. 2b is an exploded perspective view of a portion of the tool shown in FIG. 2.

An elongated second lever 36 is shown in FIGS. 2 and 2b. The elongated second lever 36 has a first portion 38 and a second portion 40. The first portion 38 and the second portion 40 can be integrally formed or can be formed separately and connected by suitable means at one of their respective ends.

The first portion 38 is preferably a circular cylinder, although the first portion 38 could take on many different shapes, and is utilized as a handle portion. The first portion 38 can also be encompassed by a fiberglass portion 39 as illustrated in, for example, FIG. 1. The first portion 38 and/or fiberglass portion 39 can have a gripping material 42, as illustrated in FIG. 1, wrapped at least partially therearound such that a user's hand can easily grip the first portion 38 of the second lever 36. The length of the first portion 38 can also be varied if desired.

The second portion 40 is preferably an elongated member which is rectangular in cross-section, although the second portion 40 could take on many different shapes. The second portion 40 has a pair of apertures 44, 46 therethrough. The second portion 40 has a height that is larger than a height of the first portion 38, but the second portion 40 and the first portion 38 have a thickness that are substantially equivalent.

A member 48, as illustrated in FIG. 2a, includes a first portion 50, a second portion 52 and a bridge portion 54. The first portion 50 is generally L-shaped such that first portion 50 has a height from a first end thereof to a middle thereof that is less than a height from the middle thereof to a second end thereof. The first portion 50 has an elongated slot 56 therethrough at the middle of the first portion 50 such that a portion of the slot 56 is positioned between the first end and the middle while another portion of the slot 56 is positioned between the middle and the second end.

The first portion 50 has an aperture 58 therethrough proximate to the first end thereof. The first portion 50 has an aperture 60 therethrough and an aperture 62 therethrough which are both proximate to the second end thereof. Aperture 60 is positioned near a top of the first portion 50 while aperture 62 is positioned near a bottom of the first portion 50. The first portion 50 further has an aperture 64 therethrough that is positioned near a bottom of the first portion 50 proximate to the middle of the first portion 50 and below the portion of the slot 56 that is positioned between the middle and the second end of the first portion 50. The first portion 50 further has an aperture 66 therethrough. Aperture 66 is positioned near a bottom of the first portion 50 and between aperture 62 and aperture 64. Aperture 64 and aperture 66 are distanced from one another the same distance that aperture 32 and aperture 34 are distanced from one another for reasons that will become apparent herein.

The second portion 52 of member 48 is a mirror image of the first portion 50 of member 48 and, therefore, the second portion 52 will not be described in detail. The apertures and slots within the second portion 52 will be referenced herein by the same reference numeral as their corresponding apertures and slots in the first portion 50, i.e., aperture 58 in first portion 50 corresponds to aperture 58 in second portion 52.

The first portion 50 and the second portion 52 of member 48 are connected to one another by the bridge portion 54. The bridge portion 54 is generally U-shaped and has a base portion 68, an extending portion 70 that extends from one end of the base portion 68 and an extending portion 72 that extends from an opposite end of the base portion 68. Extending portion 70 connects to a top of the first portion 50 from the first end of the first portion 50 to the middle of the first portion 50. Extending portion 72 connects to a top of the second portion 52 from the first end of the second portion 52 to the middle of the second portion 52. The bridge portion 54 is generally integrally formed with the first and second portions 50, 52, however, the bridge portion 54 can be formed separately therefrom and connected to the first and second portions 50, 52 by suitable means.

The bridge portion 54 has a width that is large enough such that the first portion 50 and the second portion 52 are spaced apart from one another a distance that allows the first portion 50 to be positioned on one side of the first lever 24 while the second portion 52 is positioned on an opposite side of the first lever 24.

The member 48 is connected to the first lever 24 by suitable connecting means, such as a pair of fasteners 74, 76. As best illustrated in FIG. 2, fastener 74 is inserted through aperture 64 of the first portion 50 of member 48, through aperture 32 of the second portion 28 of lever 24, and through aperture 64 of the second portion 52 of member 48. The fastener 74 can be secured outside the second portion 28 of member 48 by suitable means, such as a nut 78. As best illustrated in FIG. 2, fastener 76 is inserted through aperture 66 of the first portion 50 of member 48, through aperture 34 of the second portion 28 of lever 24, and through aperture 66 of the second portion 52 of member 48. The fastener 76 can be secured outside the second portion 28 of member 48 by suitable means, such as a nut 80.

A generally triangular member 82, as illustrated in FIG. 2a, has an aperture 84 therethrough at a first corner thereof, an aperture 86 therethrough at a second corner thereof, and an aperture 88 therethrough at a third corner thereof. The generally triangular member 82 also has an aperture 90 therethrough which is positioned between aperture 84 and aperture 88. Aperture 84 and aperture 90 are distanced from one another the same distance that aperture 44 and aperture 46 are distanced from one another for reasons that will become apparent herein.

A generally triangular member 92, which is the same as member 82, is illustrated in FIG. 2b. The generally triangular member 92 has an aperture 94 therethrough at a first corner thereof, an aperture 96 therethrough at a second corner thereof, and an aperture 98 therethrough at a third corner thereof. The generally triangular member 92 also has an aperture 100 therethrough which is positioned between aperture 94 and aperture 98. Aperture 94 and aperture 100 are distanced from one another the same distance that aperture 44 and aperture 46 are distanced from one another for reasons that will become apparent herein.

The generally triangular member 82 and the generally triangular member 92 are connected to the member 48 by suitable means, such as fastener 102. As best illustrated in FIG. 2, fastener 102 is inserted through aperture 96 of generally triangular member 92, through aperture 62 of the first portion 50 of member 48, through aperture 62 of the second portion 52 of member 48, and through aperture 86 of generally triangular member 82. The fastener 102 can be secured outside the generally triangular member 82 by suitable means, such as a nut 104. The fastener 102 allows the member 48 to pivotally rotate with respect to the generally triangular member 82 and the generally triangular member 92, thus allowing the pivotal rotation of the first lever 24 with respect to the generally triangular member 82 and the generally triangular member 92.

The generally triangular member 82 and the generally triangular member 92 are connected to the second lever 36 by suitable connecting means, such as a pair of fasteners 106, 108. As best illustrated in FIG. 2, fastener 106 is inserted through aperture 94 of generally triangular member 92, through aperture 44 of the second portion 40 of the second lever 36, and through aperture 84 of the generally triangular member 82. The fastener 106 can be secured outside the generally triangular member 82 by suitable means, such as a nut 110. As best illustrated in FIG. 2, fastener 108 is inserted through aperture 100 of generally triangular member 92, through aperture 46 of the second portion 40 of the second lever 36, and through aperture 90 of the generally triangular member 82. The fastener 108 can be secured outside the generally triangular member 82 by suitable means, such as a nut 112. This allows relative movement between the first lever 24 and the second lever 36.

Figure 2C:
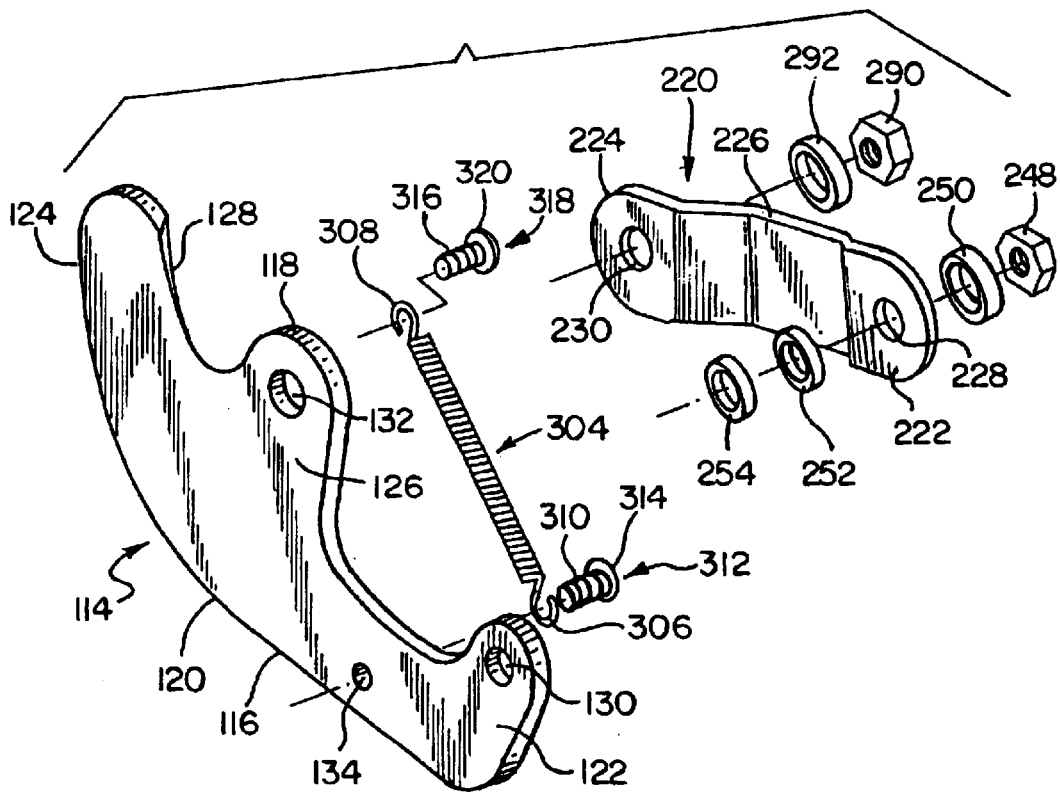
FIG. 2c is an exploded perspective view of a portion of the tool shown in FIG. 2.

A first jaw 114 is illustrated in FIGS. 2 and 2c. The first jaw 114 has an outer edge 116 and an inner edge 118. The jaw 114 is generally E-shaped such that it has a base portion 120, a first end extending portion 122 which is generally perpendicular to the base portion 120, a second end extending portion 124 which is generally perpendicular to the base portion 120, and a middle extending portion 126 which is between extending portion 122 and extending portion 124 and which is generally perpendicular to the base portion 120.

The base portion 120 extends from the first end extending portion 122 which is at a first end thereof, to the second end extending portion 124 which is at a second end thereof. The outer edge 116 is generally straight between the first end extending portion 122 and the middle extending portion 126. The outer edge 116 is generally curved between the middle extending portion 126 and the second end extending portion 124.

The ends of the extending portions 122, 124, 126 which form a part of the inner edge 118 of the first jaw 114 are generally rounded. A blade 128 is formed along the inner edge 118 between the middle extending portion 126 and the second end extending portion 124. The blade 128 can be formed in a number of different manners depending on the type of workpiece to be cut/crimped.

The first end extending portion 122 has an aperture 130 therethrough. The middle extending portion 126 has an aperture 132 therethrough. Base portion 120 has an aperture 134 therethrough between the first end extending portion 122 and the middle extending portion 126.

Figure 2D:
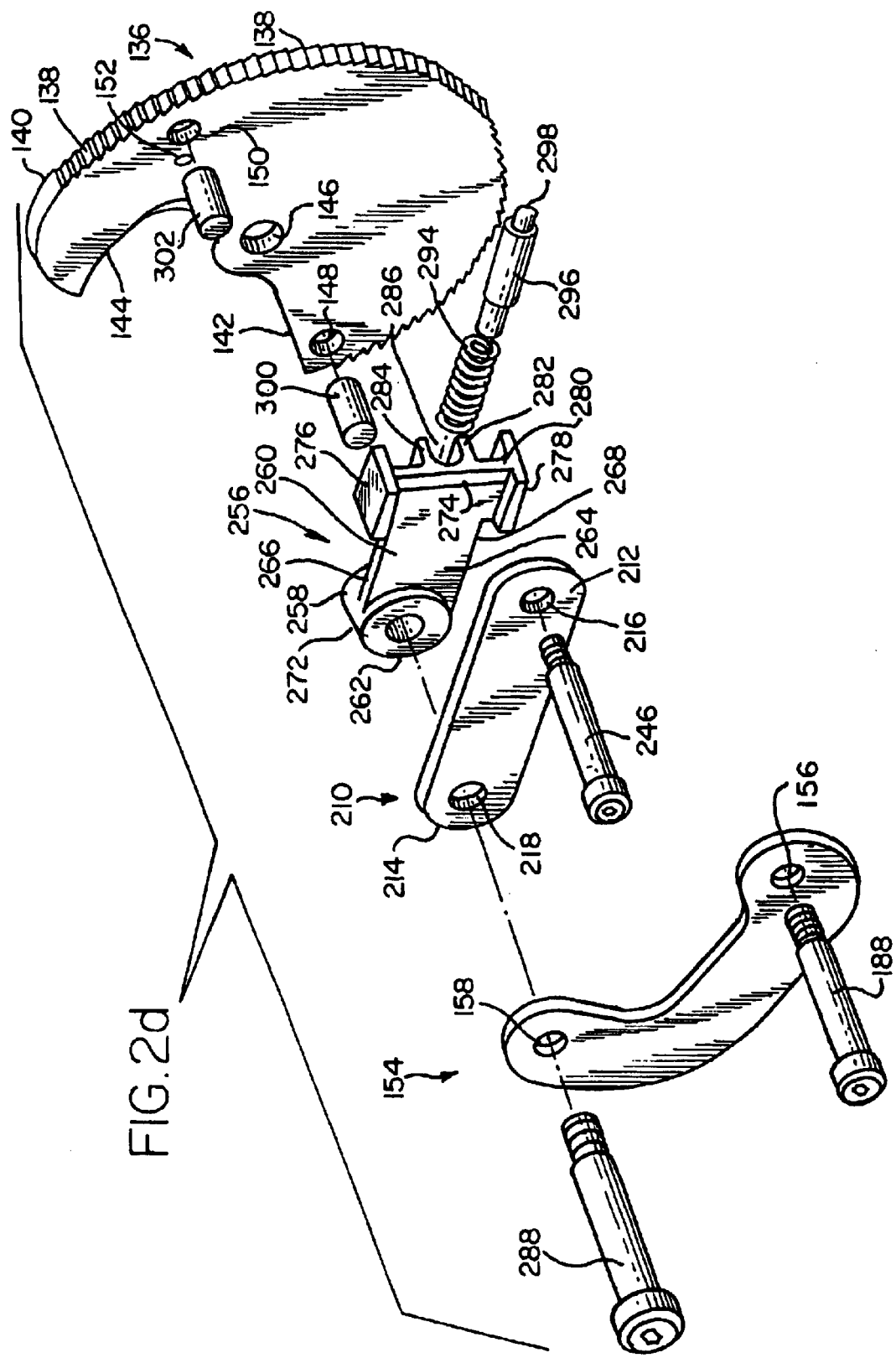
FIG. 2d is an exploded perspective view of a portion of the tool shown in FIG. 2.

A second jaw 136 is illustrated in FIGS. 2 and 2d. The second jaw 136 is generally circular, but has a portion cut-out, and has a plurality of teeth 138 along an outer edge 140 thereof. The tooth pitch of the plurality of teeth 138 is preferably 4.8 degrees. The cut-out portion of the second jaw 136 forms an inner edge 142. The inner edge 142 extends from the outer edge 140 and extends toward a middle of the second jaw 136, extends around the middle of the second jaw 136, and then extends back to the outer edge 140 of the second jaw 136. A blade 144 is formed along a portion of the inner edge 142 between the outer edge 140 and the middle of the second jaw 136. The blade 144 can be formed in a number of different manners depending on the type of workpiece to be cut/crimped.

The second jaw 136 has an aperture 146 therethrough at a center point of the circle. The second jaw 136 further has an aperture 148 therethrough which is positioned proximate to a juncture of the outer edge 140 and the inner edge 142, but distal to the blade 144 of the inner edge 142. The second jaw 136 further has an aperture 150 therethrough which is positioned along the outer edge 140 and proximate to the blade 144 of the inner edge 142. The second jaw 136 further has an aperture 152 therethrough that is positioned between aperture 150 and the blade 144 of the inner edge 142.

An elongated, generally U-shaped member 154 is illustrated in FIGS. 2 and 2d. The U-shaped member 154 has a base portion 155, a first end portion 157 and a second end portion 159. The first end portion 157 is generally curved and extends outwardly from the base portion 155 and away from the second end portion 159. An aperture 156 is provided through the first end portion 157. The second end portion 159 is generally curved and extends outwardly from the base portion 155 and away from the first end portion 157. An aperture 158 is provided through the second end portion 159.

A holding pawl 160 is illustrated in FIGS. 2 and 2b. The holding pawl 160 is generally V-shaped such that the holding pawl 160 has an extending portion 162 and an extending portion 164 which are connected at one end thereof. At the connection of the extending portions 162, 164, an aperture 166 is provided therethrough. The extending portion 162 has a shoulder 170 provided along an outside edge 168 thereof at the end opposite the connection to extending portion 164. Also along an outside edge 168 of the holding pawl 160, teeth 172 are provided on the extending portion 164, at the end opposite the connection to extending portion 162. The teeth 172 are formed to mesh with the plurality of teeth 138 provided on the outer edge 140 of the second jaw 136.

A torsion spring 174 is illustrated in FIGS. 2 and 2b. The torsion spring 174 is formed of wire that is coiled along the length of the torsion spring 174 such that an opening is formed through the torsion spring 174. One end 176 of the torsion spring 174 extends straight out from the coiled length of the spring 174 and a hook 178 is provided at an end thereof. The hook 178 of the torsion spring 174 is wrapped around the holding pawl 160 below the shoulder 170 thereof. The other end 180 of the torsion spring 174 extends straight out from the coiled length of the spring 174 and a hook 182 is provided at an end thereof. The hook 182 of the torsion spring 174 is wrapped around the outer edge 116 of the first jaw 114 proximate to the first end extending portion 122. The end 176 and the end 180 are angled from one another at approximately a 90 degree angle. The torsion spring 174 biases the holding pawl 160 such that the teeth 172 of the holding pawl 160 prevent the plurality of teeth 138 of the second jaw 136 from moving clockwise when the second jaw 136 is viewed as illustrated in FIG. 1.

A circular cylinder 184 is illustrated in FIGS. 2 and 2b. The circular cylinder 184 has a bore 186 therethrough. The circular cylinder 184 is positioned to fit within the opening of the torsion spring 184 such that the coiled length of the torsion spring 184 is wound around the circular cylinder 184.

A fastener 188 is shown in FIGS. 2 and 2d. The fastener 188 is inserted through the aperture 156 of member 154, through aperture 98 of the generally triangular member 92, through the bore 186 of the circular cylinder 184, through the aperture 166 of the holding pawl 160, through the aperture 130 of the first jaw 114, and through the aperture 88 of the generally triangular member 82. The fastener 188 can be secured outside the generally triangular member 82 by suitable means, such as a nut 190 and a pair of washers 192, 194. The circular cylinder 184 and the holding pawl 160 can pivotally rotate around the fastener 188 as further described herein.

A speed pawl 196 is illustrated in FIGS. 2 and 2a. The speed pawl 196 is generally U-shaped such that it has a base portion 198 and a pair of extending portions 200, 202, each of which extends from an opposite end of the base portion 198. Each of the extending portions 200, 202 extend from a position proximate to a first end or tab 203 of the base portion 198 to a second end 205 of the base portion 198. The extending portions 200, 202 are generally L-shaped such that the height of the extending portions 200, 202 proximate to the second end 205 of the base portion 198 is less than the height of the extending portions 200, 202 proximate to the first end 203 of the base portion 198. Each of the extending portions 200, 202 have an aperture 204 therethrough proximate to the first end 203 of the base portion 198.

A fastener 206, which may be a circular rod, is inserted through the slot 56 of the first portion 50 of the member 48, through the aperture 204 of the extending portion 200, through the aperture 204 of the extending portion 202, and through the slot 56 of the second portion 52 of the member 48. The fastener 206 is secured outside both the first portion 50 and the second portion 52 of the member 48 by suitable means. The fastener 206 can slide within the slots 56 of the first and second portions 50, 52 of the member 48, thus allowing the speed pawl 196 to move forward and backward the length of the slots 56 as further described herein.

The second end 205 of the base portion 198 of the speed pawl 196 is free and can engage with the plurality of teeth 138 of the second jaw 136 as the second jaw 136 is rotated as described herein. The bridge portion 54 of the member 48 provides resistance to the speed pawl 196, preventing the second end 205 of the base portion 198 of the speed pawl 196 from moving at an angle too great relative to the member 48.

A normally expanded or compression spring 208 is positioned between the first portion 50 and the second portion 52 of the member 48 from the first ends thereof to the middle thereof. The compression spring 208 is also positioned between the bridge portion 54 of the member 48 and the first portion 26 of the first lever 24. A first end of the spring 208 abuts against a pin 209 which is positioned through the apertures 58 of the first and second portions 50, 52 of the member 48. A second end of the spring 208 abuts against the tab 203 on the speed pawl 196 that is proximate to the base portion 198. Because of the spring force of the spring 208, the speed pawl 196 is biased within the slots 56 toward the second end of the member 48. Furthermore, speed pawl 196 is rotationally biased counterclockwise toward teeth 138 of blade 136.

A generally elongated member 210 is illustrated in FIGS. 2 and 2d. The generally elongated member 210 has rounded ends 212, 214. The member 210 has an aperture 216 therethrough proximate to end 212. The member 210 has an aperture 218 therethrough proximate to end 214.

A generally elongated member 220 is illustrated in FIGS. 2 and 2c. The generally elongated member 220 has rounded ends 222, 224 and a middle portion 226. An aperture 228 is provided therethrough proximate to the end 222. An aperture 230 is provided therethrough proximate to end 224. The middle portion 226 of the member 220 is raised such that the middle portion 226 is in a different plane than the ends 222, 224.

A drive pawl 232 is illustrated in FIGS. 2 and 2a. The drive pawl 232 is generally a triangular block wherein one of the corners of the triangular block is generally rounded. The drive pawl 232 has an aperture 234 therethrough proximate to the rounded corner. The side of the pawl 232 opposite the rounded corner, and between the other corners, has teeth 236 for meshing with the plurality of teeth 138 of the second jaw 136. The teeth 236 are positioned proximate to one of the other corners. The side of the pawl 232 opposite the rounded corner further has a pair of indents 238, 240 therein, as best illustrated in FIG. 1. The indents 238, 240 are positioned directly next to one another with indent 238 being positioned directly next to the teeth 236.

A piece 242 is illustrated in FIGS. 2 and 2a. The piece 242 is a circular cylinder having a bore 244 therethrough. The piece 242 is positioned to fit within the aperture 234 of the drive pawl 232.

A fastener 246 is shown in FIGS. 2 and 2d. The fastener 246 is positioned through the aperture 216 of member 210, through the aperture 60 of the first portion 50 of the member 48, through the bore 244 of the piece 242, through the aperture 60 of the second portion 52 of the member 48, and through the aperture 228 of the member 220. The fastener 246 can be secured to the member 220 by a nut 248 and washers 250, 252, 254. The piece 242 and the drive pawl 232 can pivotally rotate about the fastener 246 as further described herein.

A reverser 256, as illustrated in FIGS. 2 and 2d, has a circular cylindrical portion 258, a portion 260 that extends therefrom, and a portion 274 which extends from portion 260. The circular cylindrical portion 258 has a thickness that is greater than a thickness of the portion 260. The circular cylindrical portion 258 has a height that is substantially equivalent to a height of the portion 260. An aperture 262 is provided through the circular cylindrical portion 258.

The portion 260 has an inner side (not shown), an outer side 264, a top edge 266, a bottom edge 268, a first end (not shown) and a second end 272. The second end 272 is concave such that the second end 272 of the portion 260 connects to the circular cylinder portion 258.

Portion 274 has a top 276 and a bottom 278. The top 276 of the portion 274 is positioned on the top edge 266 of the portion 260 and extends generally perpendicularly therefrom toward both the inner side and the outer side 264 of the portion 260. The top 276 has a height at the first end that is less than a height of the top 276 proximate to the second end. Likewise, the bottom 278 of the portion 274 is positioned on the bottom edge 268 of the portion 260 and extends generally perpendicularly therefrom toward both the inner side and the outer side 264 of the portion 260. The bottom 278 has a height at the first end that is less than a height of the bottom 278 proximate to the second end. Thus, the portion 274 has a thickness that is greater than a thickness of the portion 260. The thickness of the portion 274 is substantially equivalent to a thickness of the circular cylindrical portion 258. The top 276 and the bottom 278 are connected to one another by piece 280 which extends along the first end of portion 260.

The portion 274 further includes two extending portions 282, 284. Extending portions 282, 284 extend generally perpendicularly from the inner surface of the portion 260 approximately the same distance as the top 276 and the bottom 278 extend away from the inner surface of the portion 260. The extending portions 282, 284 also have a length that runs from the circular cylinder portion 258 to the piece 280. The extending portions 282, 284 also define a recess 286 therebetween.

A fastener 288, as shown in FIGS. 2 and 2d, is inserted through the aperture 158 of the member 154, through the aperture 218 of the member 210, through the aperture 262 of the reverser 256, through the aperture 146 of the second jaw 136, through the aperture 132 of the first jaw 114, and through the aperture 230 of the member 220. The fastener 288 can be secured to the member 220 by suitable means, such as a nut 290 and a washer 292. The reverser 256 and the second jaw 136 can pivotally rotate about the fastener 288 as is further described herein.

A normally expanded or compression spring 294, as shown in FIGS. 2 and 2d, is positioned within the recess 286 formed by the extending portions 280, 282 and the inner surface of the portion 260. The recess 286 is closed by the connection of the second jaw 136 to the reverser 256 by the fastener 288, and thus the spring 294 is also positioned next to the second jaw 136. One end of the spring 294 abuts against the circular cylindrical portion 258 of the reverser 256 while the opposite end of the spring 294 abuts against an end of a generally cylindrical pin 296.

The opposite end of the pin 296 has a circular knob 298 which is sized to engage with either the indent 238 or the indent 240 of the drive pawl 232. The spring 294 biases the pin 296 toward the drive pawl 232 such that the knob 298 is positioned in either the indent 238 or the indent 240. When the knob 298 is positioned within the indent 238, the drive pawl 232 is biased such that the teeth 236 of the drive pawl 232 do not engage the teeth 138 of the second jaw 136 as viewed as in FIG. 1. When the knob 298 is positioned within the indent 240, the drive pawl 232 is biased such that the teeth 236 of the drive pawl 232 will engage the teeth 138 of the second jaw 136, allowing the drive pawl 232 to move the second jaw 136 counterclockwise, as will be discussed herein.

A pair of stops 300, 302, as illustrated in FIGS. 2 and 2d, are provided. Stop 300 is a cylindrical rod and is positioned within aperture 148 of the second jaw 136 and extends outwardly therefrom toward the reverser 256. The stop 300 is capable of abutting against the bottom 278 of the reverser 256, as will be explained in more detail in the operation of the tool 20. The stop 302 is a cylindrical rod and is positioned within the aperture 150 of the second jaw 136 and extends outwardly therefrom toward the reverser 256. The stop 302 is capable of abutting against the top 276 of the reverser 256, as will be explained in more detail in the operation of the tool 20.

An extension spring 304 is illustrated in FIGS. 2 and 2c. The extension spring 304 has a first end with a hook 306 and a second end with a hook 308. The hook 306 is wrapped around a shank portion 310 of a fastener 312. The fastener 312 also has a head portion 314. After the hook 306 is wrapped around the shank portion 310, the shank portion 310 is inserted into the aperture 134 of the first jaw 114 such that the hook 306 is between the first jaw 114 and the head portion 314 of the fastener 312, with the head portion 314 being proximate to the member 220. The hook 308 is wrapped around a shank portion 316 of a fastener 318. The fastener 318 also has a head portion 320. After the hook 308 is wrapped around the shank portion 316, the shank portion 316 is inserted into the aperture 152 of the second jaw 136 such that the hook 308 is between the second jaw 136 and the head portion 320 of the fastener 318, with the head portion 320 being proximate to the first jaw 114.

Figure 3:
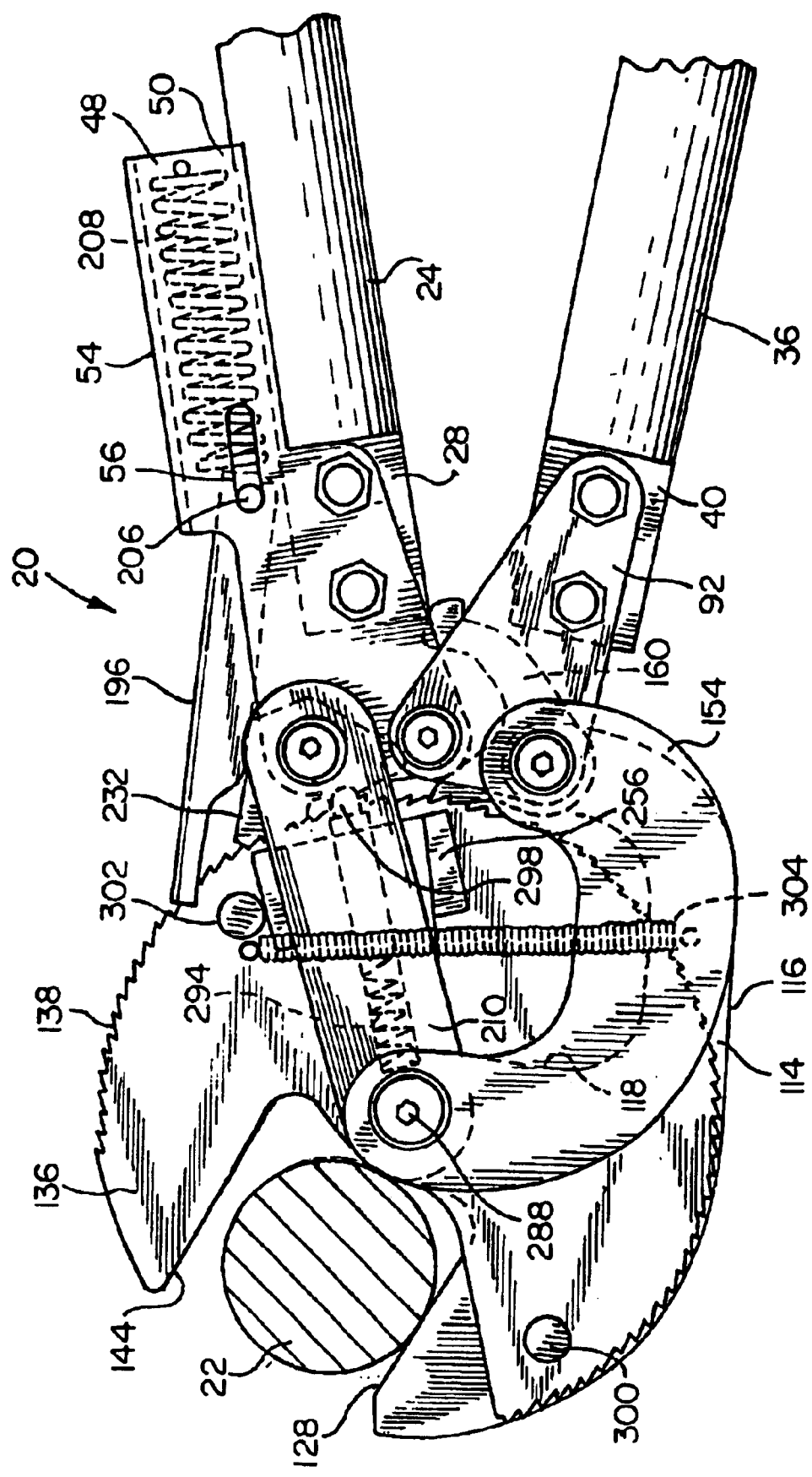

Now that the specifics of the tool 20 have been described, operation of the tool 20 is described in detail with reference to FIGS. 1 and 3–9. FIGS. 1 and 3 illustrate the tool 20 prior to the cutting/crimping process when the cable or workpiece 22 is inserted between the blade 128 of the first jaw 114 and the blade 144 of the second jaw 136 by a user. The blade portions 128, 144 are offset from one another because of the connection of the first jaw 114 to the second jaw 136 by fastener 288, thus allowing the blade portions 128, 144 to shear the workpiece 22 when the tool 20 is operated in the cut mode.

As illustrated in FIG. 1, prior to the cutting/crimping process, the first lever 24 and the second lever 36 are in a closed position such that the rear ends of the first lever 24 are generally proximate to the second lever 36.

The torsion spring 174 biases the holding pawl 160 toward the second jaw 136 in order to force the teeth 172 of the holding pawl 160 to engage with the plurality of teeth 138 of the second jaw 136. When the levers 24, 36 are closed, though, the second portion 28 of the first lever 24 abuts against the extending portion 162 of the holding pawl 160 at a position above the shoulder 170 where the hook 178 of the torsion spring 174 is wrapped therearound, thus preventing the teeth 172 of the holding pawl 160 from engaging with the plurality of teeth 138 of the second jaw 136.

The second end 205 of the base portion 198 of the speed pawl 196 rests against the plurality of teeth 138 of the second jaw 136. The fastener 206, which is connected to the speed pawl 196, is positioned in the slots 56 of the first portion 50 and the second portion 52 of the member 48 proximate to the first end 203 of the speed pawl 196, with the speed pawl 196 being biased in this position by the spring 208. Because of the resting of the second end 205 of the speed pawl 196 against the plurality of teeth 138, along with the connection of the speed pawl 196 to the fastener 206 at the first end 203 of the speed pawl 196, the speed pawl 196 is positioned at a small angle relative to the top of the first and second portions 50, 52 of the member 48.

The drive pawl 232 is positioned such that the teeth 236 of the drive pawl 232 are engaged with the plurality of teeth 138 of the second jaw 136 as the knob 298 of the pin 296 is positioned within the indent 240 of the drive pawl 232. The knob 298 of the pin 296 stays within the indent 240 by the force of spring 294.

The member 210 is positioned such that a top thereof abuts against the top 276 of the portion 274 of the reverser 256. A bottom of the member 210 does not abut against the bottom 278 of the portion 274 of the reverser 256.

The stop 302 abuts against the top 276 of the portion 274 of the reverser 256.

The spring 304 is in its normally compressed state.

After the user has placed the workpiece 22 between the blade 128 of the first jaw 114 and the blade 144 of the second jaw 136, the user grips the first lever 24 with one hand and grips the second lever 36 with the other hand. The user then begins to open the levers 24, 36 by pulling the levers 24, 36 away from one another as shown in FIG. 3.

As illustrated in FIG. 3, when the user begins to open the levers 24, 36, the second end of the base portion 198 of the speed pawl 196 engages with one of the plurality of teeth 138 of the second jaw 136.

As the levers 24, 36 are opened, the second portion 28 of the first lever 24 and the extending portion 162 of the holding pawl 160 continue to abut against one another, but the teeth 172 of the holding pawl 160 come closer to being in contact with the plurality of teeth 138 of the second jaw 136 to prevent the second jaw 136 from moving in a clockwise position, when the second jaw 136 is viewed as shown in FIG. 3, such that the blade 144 of the second jaw 136 would move away from the workpiece 22 and the blade 128 of the first jaw 114.

Figure 4:
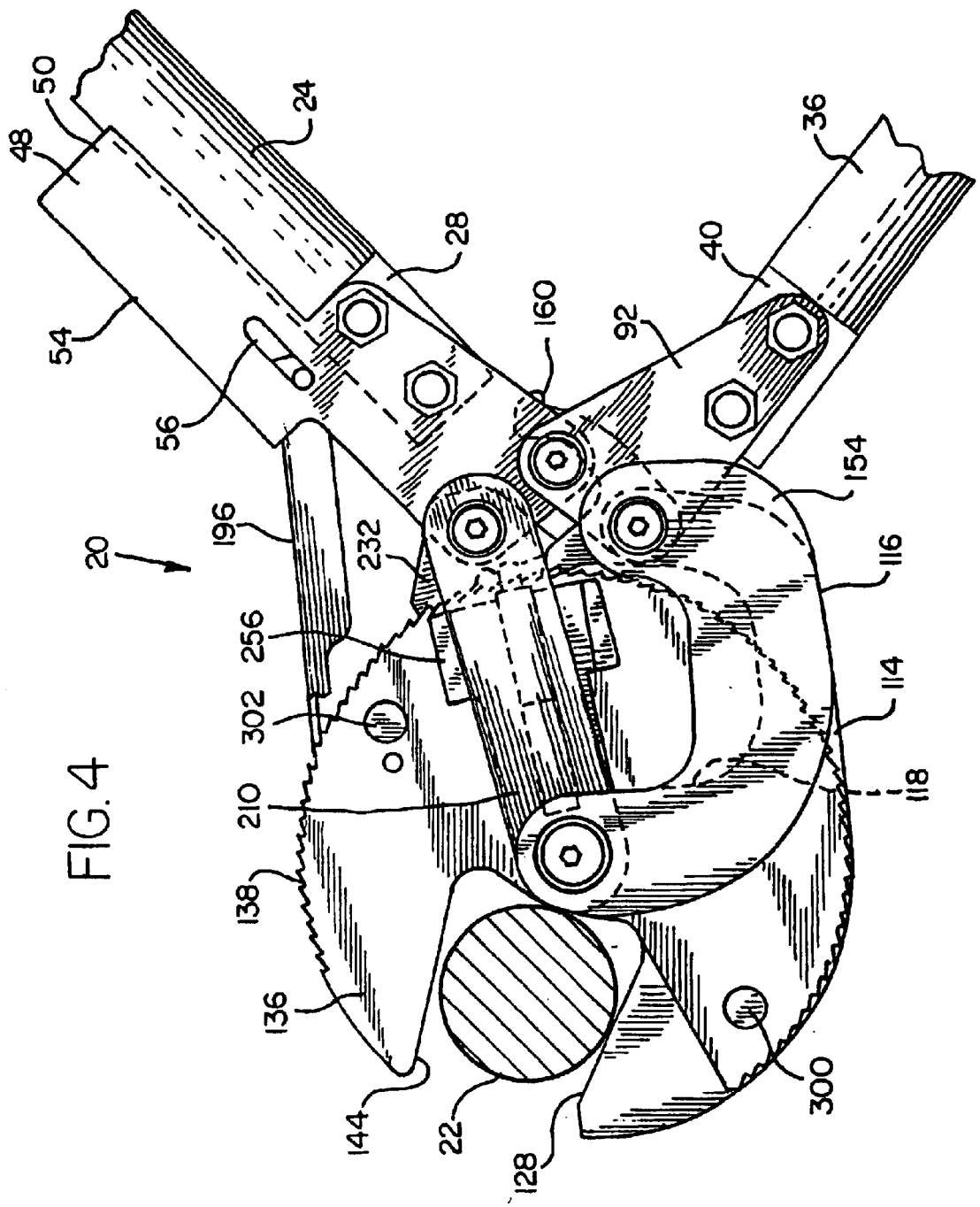

As illustrated in FIG. 4, the levers 24, 36 are completely opened, such that the rear ends of levers 24, 36 are positioned as far away from one another as possible and are approximately perpendicular to one another.

By completely opening the levers 24, 36, the speed pawl 196 advances the blade 144 of the second jaw 136 toward the workpiece 22 and the blade 128 of the first jaw 114. The speed pawl 196 preferably advances the blade 144 of the second jaw 136 by three teeth when the levers 24, 36 are opened prior to the blade portions 128, 144 meeting resistance from the workpiece 22. The angle of the speed pawl 196 with respect to the tops of the first and second portions 50, 52 of the member 48 also increases. The angle which the speed pawl 196 can achieve relative to the tops of the first and second portions 50, 52 of the member 48 is limited by the bridge portion 54 of the member 48 as the first end of the base portion 198 of the speed pawl 196 abuts against the bridge portion 54 when the levers 24, 36 reach their maximum opening.

Because of the advancement of the blade 144 of the second jaw 136, the stop 302 and the top 276 of the portion 274 of the reverser 256 separate from one another while the stop 300 on the second jaw 136 moves closer to abutment with the bottom 278 of the portion 274 of the reverser 256.

Further, because of the advancement of the blade 144 of the second jaw 136, the spring 304 is forced to expand such that it no longer rests in its normally compressed state.

As the levers 24, 36 are completely opened, the extending portion 162 of the holding pawl 160 and the second portion 28 of the first lever 24 also separate from one another such that the teeth 172 of the holding pawl 160 engage with the teeth 138 of the second jaw 136 because of the spring force provided by the torsion spring 174, thus preventing the blade 144 on the second jaw 136 from retreating.

As the levers 24, 36 are opened, the teeth 236 of the drive pawl 232 move over the teeth 138 of the second jaw 136 such that the drive pawl 232 pushes against the knob 298 of the pin 296 to compress the spring 294.

Figure 5:
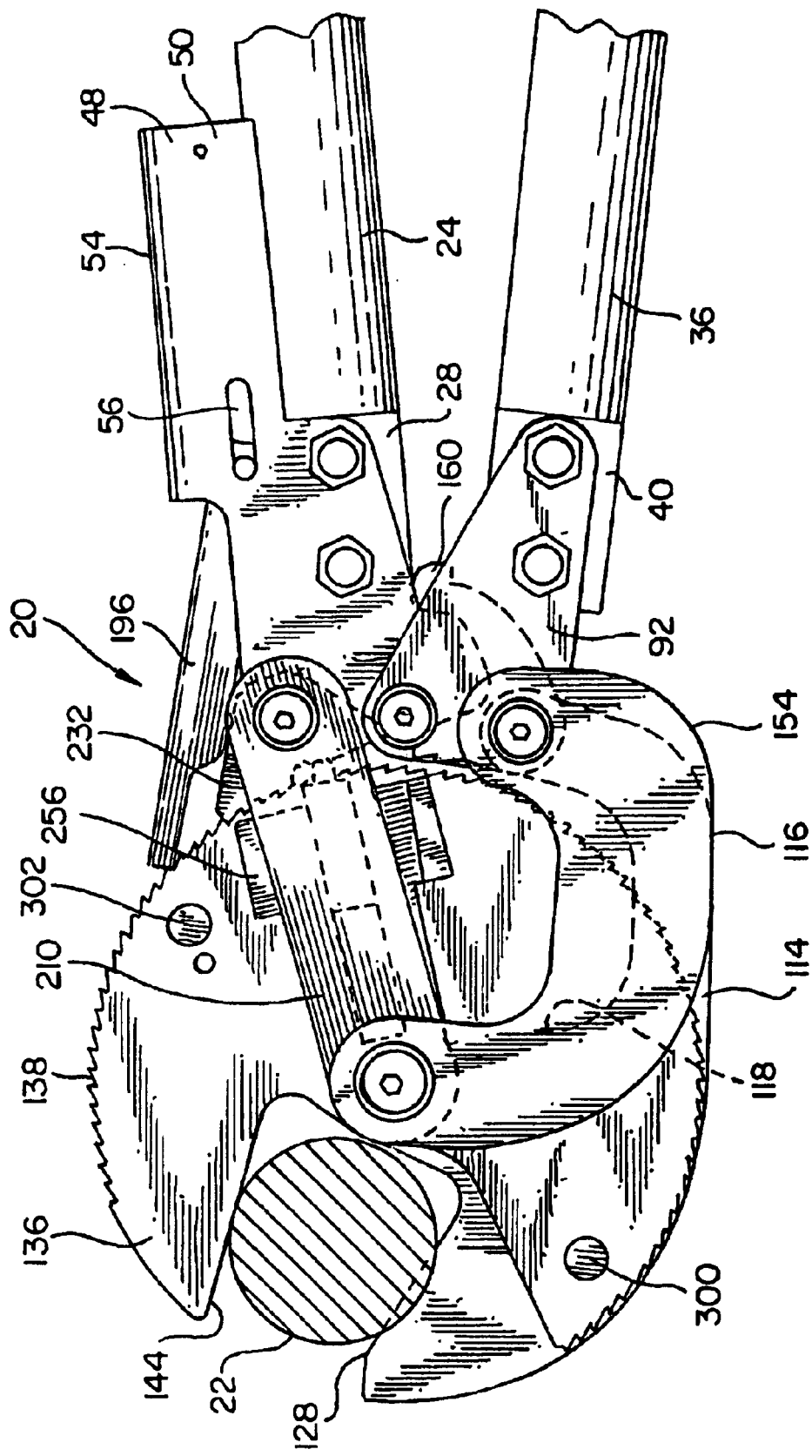

After the levers 24, 36 are completely opened and the speed pawl 196 has advanced the second jaw 136, the user pushes the levers 24, 36 back to a closed position, where the rear ends of the levers 24, 36, are proximate to one another and are at a position where they are generally parallel to one another as shown in FIG. 5.

By closing the levers 24, 36, the speed pawl 196 is moved across the plurality of teeth 138 of the second jaw 136. The spring 294 pushes back against the pin 296 to push the knob 298 into the indent 240 of the drive pawl 232, forcing the teeth 236 of the drive pawl 232 to engage the plurality of teeth 138 of the second jaw 136 and to advance the blade 144 of the second jaw 136 toward the blade 128 of the first jaw 114 and the workpiece 22. The drive pawl 232 preferably advances the blade 144 of the second jaw 136 by one tooth when the levers 24, 36 are closed.

Because of the advancement of the blade 144 of the second jaw 136, the stop 302 and the top 276 of the portion 274 of the reverser 256 further separate from one another while the stop 300 on the second jaw 136 moves further closer to abutment with the bottom 278 of the portion 274 of the reverser 256.

Further, because of the advancement of the blade 144 of the second jaw 136, the spring 304 is forced to further expand from its normally compressed state.

The closing of the levers 24, 36 further forces the extending portion 162 of the holding pawl 160 to abut with the second portion 28 of the first lever 24 forcing the teeth 172 of the holding pawl 160 to become disengaged from the plurality of teeth 138 of the second jaw 136. The extending portion 162 further separates from the fastener 102.

The foregoing description relating to FIGS. 4 and 5 continues until the blade 144 of the second jaw 136 and the blade 128 of the first jaw 114 are both engaged or in contact with the workpiece 22, such that the workpiece 22 is providing resistance to the counterclockwise movement of the second jaw 136.

Once the workpiece 22 provides resistance to the counterclockwise movement of the second jaw 136, as the blade 144 of the second jaw 136 and the blade 128 of the first jaw 114 are in contact with the workpiece 22, the user again completely opens the levers 24, 36 as depicted in FIG. 6.

As the levers 24, 36 are opened, the extending portion 162 of the holding pawl 160 and the second portion 28 of the first lever 24 separate from one another. The extending portion 162 of the holding pawl 160 abuts against the fastener 102. The torsion spring 174 biases the holding pawl 160 toward the second jaw 136 to force the teeth 172 of the holding pawl 160 to engage with the plurality of teeth 138 of the second jaw 136.

Unlike the opening of the levers 24, 36 as illustrated and described with reference to FIG. 4, the opening of the levers 24, 36 with reference to FIG. 6, does not force the speed pawl 196 to advance the blade 144 of the second jaw 136 toward the workpiece 22 and the blade 128 of the first jaw 114. Rather, the resistance of the workpiece 22 against the speed pawl 196 is greater than the spring force of the spring 208 against the speed pawl 196, thus the speed pawl 196 overcomes the spring force of the spring 208 and causes fastener 206 to move within the slots 56 of the first and second portions 50, 52 of the member 48 to a position proximate to the first end of the member 48. Thus the fastener 206 and, in effect, the speed pawl 196, simply oscillate against the spring 208 within the slots 56. Thus, the second end 205 of the base portion 198 of the speed pawl 196 simply idles against the plurality of teeth 138 of the second jaw 136, unable to advance the blade 144 of the second jaw 136 toward the workpiece 22 and the blade 128 of the first jaw 114.

As the levers 24, 36 are opened, the teeth 236 of the drive pawl 232 move over the teeth 138 of the second jaw 136 such that the drive pawl 232 pushes against the knob 298 of the pin 296 to compress the spring 294.

After the user has pulled the levers 24, 36 completely apart as shown in FIG. 6, the user again pushes the levers 24, 36 together to a closed position, as illustrated in FIG. 7, where the rear ends of the levers 24, 36, are proximate to one another and are at a position where they are generally parallel to one another.

By closing the levers 24, 36, the spring 294 pushes back against the pin 296 to push the knob 298 into the indent 240 of the drive pawl 232, forcing the drive pawl 232 to engage the plurality of teeth 138 of the second jaw 136 and to advance the blade 144 of the second jaw 136 into the workpiece 22 and toward the blade 128 of the first jaw 114, which also is forced into the workpiece 22. The drive pawl 232 preferably advances the blade 144 of the second jaw 136 by one tooth when the levers 24, 36 are closed.

Because of the advancement of the blade 144 of the second jaw 136, the stop 302 and the top 276 of the portion 274 of the reverser 256 further separate from one another while the stop 300 on the second jaw 136 moves further closer to abutment with the bottom 278 of the portion 274 of the reverser 256.

Further, because of the advancement of the blade 144 of the second jaw 136, the spring 304 is forced to further expand from its normally compressed state.

The closing of the levers 24, 36 further forces the extending portion 162 of the holding pawl 160 to abut with the second portion 28 of the first lever 24, forcing the teeth 172 of the holding pawl 160 to become disengaged from the plurality of teeth 138 of the second jaw 136. The extending portion 162 further separates from the fastener 102.

The foregoing description relating to FIGS. 6 and 7 continues until the bottom 278 of the portion 274 of the reverser 256 abuts against the stop 300 provided on the second jaw 136. At this point, the tool 20 has either cut through the workpiece 22 or crimped the workpiece 22 as desired. The spring 304 is also expanded well beyond its normally compressed state as it is wound around the fastener 288.

Once the stop 300 abuts against the bottom 278 of the portion 274 of the reverser 256, the continued movement of the stop 300 by continued movement of the second jaw 136 pushes the reverser 256 thus forcing the knob 298 of the pin 296 to move from a position within the indent 240 of the drive pawl 232 to the indent 238 of the drive pawl 232, as shown in FIG. 8. The member 210 also changes position such that the bottom of the member 210 abuts against the bottom 278 of the portion 274 of the reverser 256 while the top of the member 210 does not abut against the top 276 of the portion 274 of the reverser 256.

By the knob 298 of the pin 296 being forced into the indent 238 of the drive pawl 232, the teeth 236 of the drive pawl 232 become disengaged from the plurality of teeth 138 of the second jaw 136, thus entirely disengaging the drive pawl 232 from the second jaw 136. The disengagement of the drive pawl 232 from the second jaw 136 also causes the disengagement of the speed pawl 196 from the second jaw 136 as the drive pawl 232 abuts against the speed pawl 196, lifting the speed pawl 196 away from the plurality of teeth 138 of the second jaw 136.

The teeth 172 of the holding pawl 160 also become disengaged from the plurality of teeth 138 of the second jaw 136 when the levers 24, 36 are closed by the contact of the extending portion 162 with the second portion 28 of the first lever 24.

Because all three pawls 160, 196, 232 are disengaged from the second jaw 136, nothing prevents the second jaw 136 from moving clockwise and, thus, the spring 304 returns to its normally compressed state. When the spring 304 returns to its normally compressed state, the spring 304 forces the second jaw 136 to return, in a clockwise manner, to its original position as shown in FIG. 9. As the second jaw 136 is in its original position, the continued movement of the stop 302 by continued movement of the second jaw 136 pushes against the top 276 of the portion 274 of the reverser 256, thus forcing the knob 298 of the pin 296 to move from the indent 238 back to the indent 240.

With the knob 298 of the pin 296 forced into the indent 240 of the drive pawl 232, the teeth 236 of the drive pawl 232 are re-engaged with the plurality of teeth 138 of the second jaw 136. The re-engagement of the drive pawl 232 with the second jaw 136 allows for the speed pawl 196 to again rest against the plurality of teeth 138 of the second jaw 136.

The tool 20 is then ready for then next cutting/crimping cycle.

It should be noted that the automatic blade return can be performed manually by the user physically switching the reverser 256. The reverser 256 can further be manually manipulated by an operator of the tool 20 in order to return the second jaw 136 from the closed position to the open position prior to the workpiece 22 being cut or crimped. It should further be noted that the drive pawl 232, and at least a portion of the speed pawl 196, are positioned inside the tool 20, protected by the triangular members 82, 92 and the member 48.

While a preferred embodiment of the present invention is shown and described, it is envisioned that those skilled in the art may devise various modifications without departing from the spirit and scope of the foregoing description.

The invention is claimed as follows:

1. A tool for cutting or crimping a workpiece comprising:

a pair of handles;

a first jaw which is fixed to one of said handles;

a second jaw having a blade portion formed along an inner edge thereof, said second jaw being pivotally mounted to said first jaw;

means for advancing said second jaw from an open position to a closed position wherein said blade portion of said second jaw is distal to said first jaw in said open position and is proximate to said first jaw in said closed position, said advancing means includes a member engageable with said second jaw and having a first indent and a second indent; and means for automatically returning said second jaw from said closed position to said open position, said automatically returning means includes a pair of stops provided on said second jaw, a member having a first end and a second end, said first end being pivotally mounted to said second jaw, said member being capable of abutting against said stops, a normally expanded spring attached to said member, a pin attached to said normally expanded spring and selectively engageable with one of said first indent of said member and said second indent of said member, and a normally contracted spring attached to said second jaw and said first jaw.

2. A tool as defined in claim 1, wherein said member of said advancing means drives said second jaw from said open position to said closed position when said handles are moved toward one another.

3. A tool as defined in claim 2, wherein said advancing means further includes an advancing member for advancing said second jaw from said open position to said closed position when said handles are moved away from one another until said second jaw meets resistance with the workpiece, said advancing member idling against said second jaw when said handles are moved away from one another after said second jaw meets resistance with the workpiece.

4. A tool as defined in claim 3, wherein said advancing member is spring loaded.

5. A tool as defined in claim 3, wherein said second jaw includes a plurality of teeth formed along an outer edge thereof and wherein each of said members of said advancing means are pawls, said pawls being capable of engaging with said plurality of teeth.

6. A tool as defined in claim 3, wherein said advancing means further includes a third member for preventing said second jaw from moving toward said open position when said handles are being moved toward and away from one another.

7. A tool for cutting or crimping a workpiece comprising:

a pair of handles;

a first jaw which is fixed to one of said handles;

a second jaw which is pivotally mounted to said first jaw, said second jaw having a blade portion formed along an inner edge thereof and a plurality of teeth formed along an outer edge thereof;

first means for selectively engaging said plurality of teeth of said second jaw, said first means advancing said second jaw toward said first jaw by a predetermined number of tooth spaces each time said handles are moved toward each other, said first means includes a pawl operatively associated with one of said handles, said pawl having teeth thereon which are adapted to mesh with said plurality of teeth of said second jaw, said pawl, further having a pair of indents therein next to said teeth; and second means for selectively engaging said plurality of teeth of said second jaw, said second means advancing said second jaw toward said first jaw by more tooth spaces than said predetermined number of tooth spaces each time said handles are moved away from each other until said second jaw meets resistance with the workpiece.

8. A tool as defined in claim 7, wherein said second means includes a pawl operatively associated with one of said handles, said pawl being adapted to engage with said plurality of teeth, said pawl being biased toward said plurality of teeth along said outer edge of said second jaw.

9. A tool as defined in claim 8, wherein said pawl of said second means has a base portion and a pair of extending portions which extend from opposite ends of said base portion and from a first end of said base portion to a second end of said base portion.

10. A tool as defined in claim 8, wherein said pawl of said second means is biased toward said plurality of teeth of said second jaw.

11. A tool as defined in claim 10, wherein said pawl of said second means is spring biased toward said plurality of teeth of said second jaw.

12. A tool as defined in claim 7, wherein said second means advances said second jaw toward said first jaw by at least two times as many tooth spaces than said predetermined number of tooth spaces each time said handles are moved away from each other until said second jaw meets resistance with the workpiece.

13. A tool as defined in claim 12, wherein said second means advances said second jaw toward said first jaw by three times as many tooth spaces than said predetermined number of tooth spaces each time said handles are moved away from each other until said second jaw meets resistance with the workpiece.

14. A tool as defined in claim 7, wherein said pawl is a block having three corners and three sides, and wherein one of said corners is generally rounded, said pawl has an aperture therethrough proximate to said rounded corner.

15. A tool as defined in claim 7, further including third means for preventing said second jaw from moving toward said open position when said handles are being moved toward and away from one another.

\* \* \* \* \*

UNITED STATES PATENT AND TRADEMARK OFFICE
CERTIFICATE OF CORRECTION

PATENT NO. : 6,766,581 B2
DATED : July 27, 2004
INVENTOR(S) : William F. Nordlin It is certified that error appears in the above-identified patent and that said Letters Patent is hereby corrected as shown below:

Title page,
Item [56], should read as follows:
-- References Cited,
U.S. PATENT DOCUMENTS
1,413,447      04/22   Wintemute
FOREIGN PATENT DOCUMENTS
JP      60161020      08/85 --

Signed and Sealed this

Eighteenth Day of January, 2005

JON W. DUDAS
*Director of the United States Patent and Trademark Office*